United States Patent
Nagata et al.

(10) Patent No.: US 12,175,230 B2
(45) Date of Patent: Dec. 24, 2024

(54) INFORMATION PROCESSING DEVICE, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Yu Nagata, Chofu (JP); Toshihiro Nakamura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/825,201

(22) Filed: May 26, 2022

(65) Prior Publication Data

US 2022/0413835 A1    Dec. 29, 2022

(30) Foreign Application Priority Data

Jun. 29, 2021    (JP) ................... 2021-108005

(51) Int. Cl.
  *G06F 8/60*    (2018.01)
  *G06F 8/65*    (2018.01)
  *G06F 8/71*    (2018.01)
  *G07C 5/00*    (2006.01)

(52) U.S. Cl.
  CPC .................. *G06F 8/65* (2013.01); *G06F 8/71* (2013.01); *G07C 5/008* (2013.01)

(58) Field of Classification Search
  CPC ... G06F 8/65; G06F 8/71; G06F 8/656; G07C 5/008; G07C 5/00; G07C 5/02
  See application file for complete search history.

(56) References Cited

U.S. PATENT DOCUMENTS

| | | | |
|---|---|---|---|
| 2013/0096737 A1 | 4/2013 | Suganuma et al. | |
| 2018/0203683 A1* | 7/2018 | Kim | G06F 8/65 |
| 2020/0175432 A1 | 6/2020 | Iwasaki et al. | |
| 2021/0191714 A1* | 6/2021 | Ullman | G06F 11/0739 |
| 2022/0334822 A1* | 10/2022 | Sakakibara | H04L 67/34 |

FOREIGN PATENT DOCUMENTS

| | | |
|---|---|---|
| JP | 2012-14253 A | 1/2012 |
| JP | 2018-132979 A | 8/2018 |
| JP | 2020-38585 A | 3/2020 |
| WO | 2018/230646 A1 | 12/2018 |

OTHER PUBLICATIONS

M. Y. Hassan, S. Choudhury and Z. M. Fadlullah, "On Optimal Scheduling of OTA Software Updates for Smart Vehicles Leveraging Fog Computing," 2021 International Wireless Communications and Mobile Computing (IWCMC), Harbin City, China, 2021, pp. 2044-2049 (Year: 2021).*

* cited by examiner

*Primary Examiner* — Hanh Thi-Minh Bui
(74) *Attorney, Agent, or Firm* — Sughrue Mion, PLLC

(57) ABSTRACT

An information processing device includes a control unit that executes acquiring information on update of a program implemented in a vehicle, and formulating a plan for updating the program while the vehicle is stopped in an operation plan based on the information on the update of the program.

14 Claims, 9 Drawing Sheets

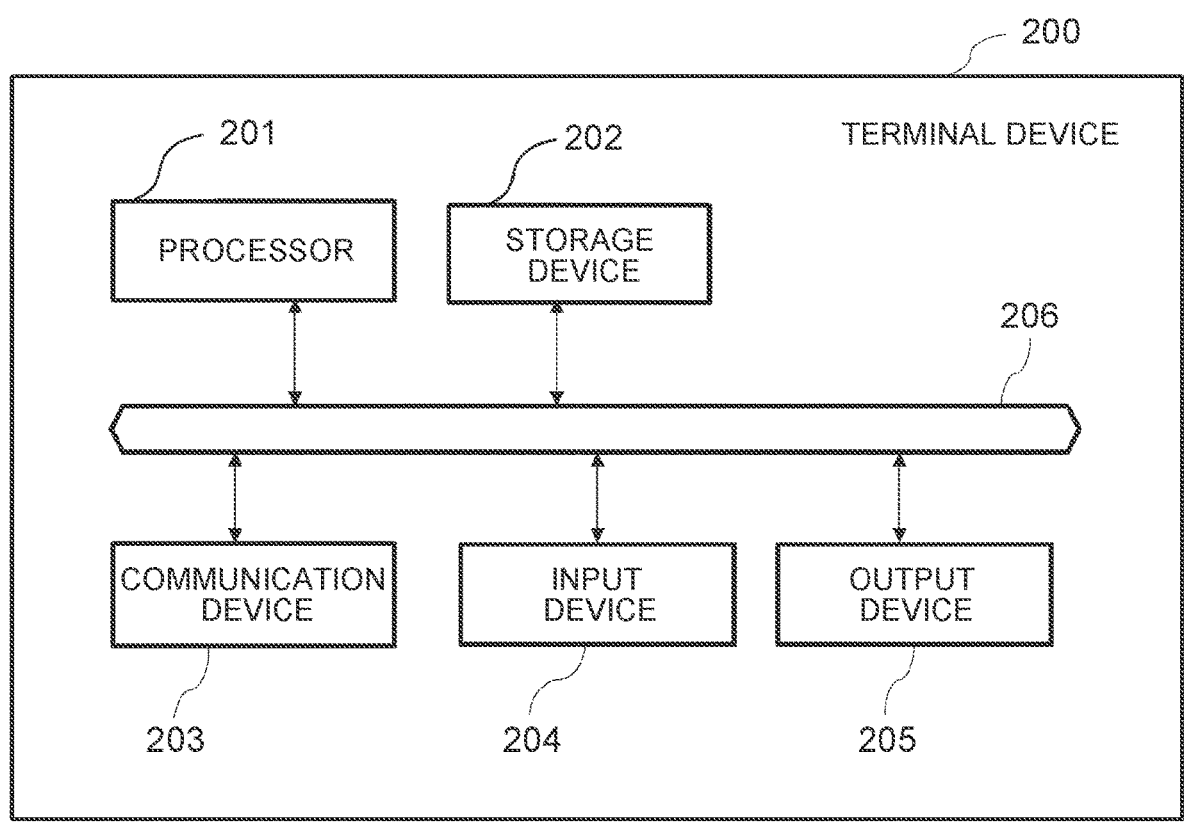

FIG. 3

```
RELEASE NOTE (
 [vehicle type:E-palette G0, Sysyem Version:V07-01, release date:ddmmyyyy, ],
 [ECU type:Central ECU, [Program type:PC1, Version:V07-01-1, volume:V1MB, ...],
                        [Program type:PC2, Version:V07-01-3, volume:V2MB, ...],
                        ...
 [ECU type:   ADS ECU, [Program type:PA1, Version:V07-01-1, volume:V3 MB, ...],
                       [Program type:PA2, Version:V07-01-1, volume:V4 MB, ...],
                       ...
 [ECU type:   SIS ECU, [Program type:PS1, Version:V07-01-6, volume:V5 MB, ...],
                       [Program type:PS2, Version:V07-01-1, volume:V6 MB, ...],
                       ...
 [ECU type:   RSE ECU, [Program type:PR1, Version:V07-01-1, volume:V7 MB, ...],
                       [Program type:PR2, Version:V07-01-1, volume:V8 MB, ...],
                       ...
 ...}
```

FIG. 4

| MOBILE BODY ID | E-PALETTE EV1 | | | | | | | | |
|---|---|---|---|---|---|---|---|---|---|
| DATE | DDMMYYYY | | | | | | | | |
| TIME ZONE | 12:00 a.m. | ... | 8:00 a.m. | 9:00 a.m. | ... | 10:00 a.m. | 11:00 a.m. | 12:00 p.m. | 1:00 p.m. | ... | 10:00 p.m. | 11:00 p.m. |
| SCHEDULE | MAINTE-NANCE (CHARGING, DOWNLOAD, UPDATE) | ... | MAINTE-NANCE (CHARGING, DOWNLOAD, UPDATE) | OPERA-TION | ... | OPERA-TION | MAINTE-NANCE (CHARGING) | MAINTE-NANCE (CHARGING) | OPERA-TION | ... | OPERA-TION | MAINTE-NANCE (CHARGING) |

FIG. 5

| MOBILE BODY ID | E-PALETTE EV1 |
|---|---|
| LAST UPDATE DATE | D2/M2/Y2 |
| SYSTEM VERSION OF COMPUTER PROGRAM GROUP | V06-99 |
| PREVIOUS OPERATION COMPLETION DATE AND TIME | TT:00 ON D1/M1/Y1 |
| BATTERY STATE | PP % |

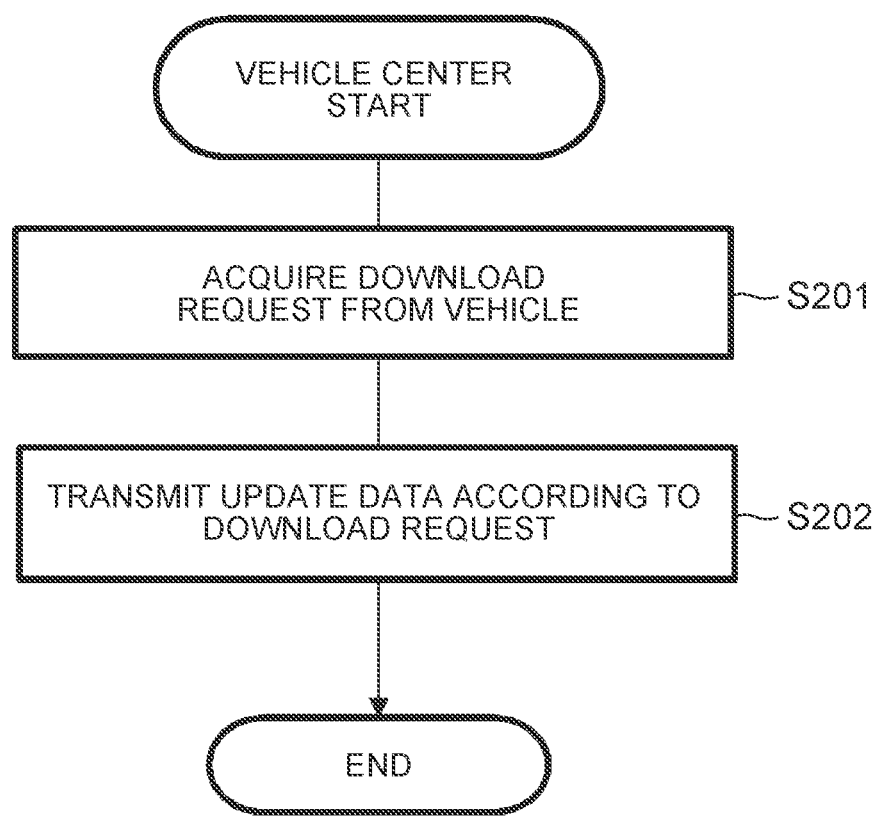

INFORMATION PROCESSING DEVICE, INFORMATION PROCESSING METHOD, AND INFORMATION PROCESSING SYSTEM

CROSS-REFERENCE TO RELATED APPLICATION

This application claims priority to Japanese Patent Application No. 2021-108005 filed on Jun. 29, 2021, incorporated herein by reference in its entirety.

BACKGROUND

1. Technical Field

The present disclosure relates to an information processing device, an information processing method, and an information processing system.

2. Description of Related Art

Conventionally, there is an operation schedule determination device for acquiring schedule information of a plurality of users and attribute information indicating a mutual relationship between at least part of users among the users, and determining an operation schedule of an autonomous driving vehicle based on the acquired information.

SUMMARY

An object of the present disclosure is to provide an information processing device, an information processing method, and an information processing system capable of executing update of a program implemented in a vehicle at an appropriate timing.

An aspect of the present disclosure is an information processing device including a control unit that executes: acquiring information on update of a program implemented in a vehicle; and formulating a plan for updating the program while the vehicle is stopped in an operation plan based on the information on the update of the program.

As another aspect, the present disclosure can include an information processing method, a computer program, a recording medium on which the computer program is recorded, an information processing system, and the like having the same characteristics as the above information processing device.

According to the present disclosure, it is possible to update the program implemented in the vehicle at an appropriate timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram showing a configuration example of a terminal device;

FIG. 3 is an example of a release note transmitted from a vehicle center to a control center;

FIG. 4 is an example of operation schedule data distributed by the control center to each mobile body;

FIG. 5 is a diagram illustrating state information of each mobile body held by the control center;

FIG. 9 is a flowchart showing a processing example of the vehicle center.

DETAILED DESCRIPTION OF EMBODIMENTS

An information processing device according to an embodiment disclosure includes a control unit. The control unit executes acquiring information on update of a program implemented in a vehicle, and formulating a plan for updating the program while the vehicle is stopped in an operation plan based on the information on the update of the program.

Here, the program is preferably a program related to travel control of the vehicle, but may be another program. When the program is implemented in the vehicle, the program is used or executed in an in-vehicle computer provided in the vehicle.

Hereinafter, the information processing device, an information processing method, and an information processing system according to the embodiment will be described with reference to the drawings. The configurations of the embodiment are shown as examples. The configurations of the embodiments can be combined as appropriate.

System Configuration

Figure 1:
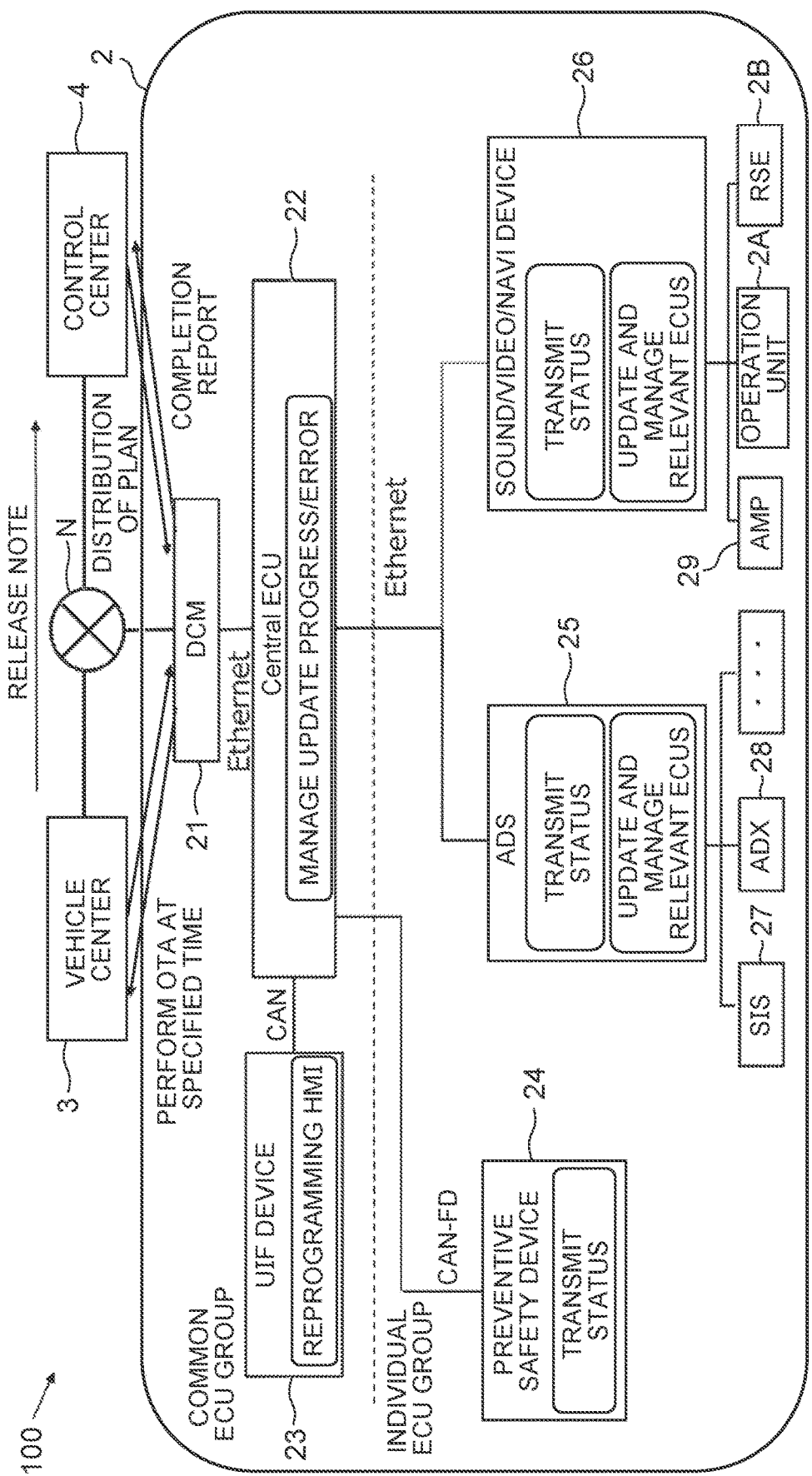
FIG. 1 is a diagram illustrating an information processing system of a first embodiment.

FIG. 1 is a diagram illustrating an information processing system 100 of a first embodiment. The information processing system 100 includes a mobile body 2, a computer of a vehicle center 3, and a computer of a control center 4. Hereinafter, the computer of the vehicle center 3 and the computer of the control center 4 are also simply referred to as the vehicle center 3 and the control center 4, respectively. The mobile body 2, the vehicle center 3, and the control center 4 are connected by a network N.

The network N includes a wired network and a wireless network. The wired network is also called, for example, a core network, a backbone, or the like, and is a broadband network shown as an example of an optical fiber network or the like. The wireless network includes, for example, a mobile phone network shown as an example of long term evolution (LTE), a 5th generation mobile communication system (5G), a 6th generation mobile communication system (6G), and the like.

The mobile body 2 is, for example, a vehicle. The vehicle may be a four-wheeled, a three-wheeled, or a two-wheeled vehicle. The vehicle may be driven by an engine or a motor. The vehicle may be a vehicle equipped with an autonomous driving system capable of autonomous driving or automatic driving. The mobile body 2 is an example of a vehicle capable of communicating with the control center 4 that is an information processing device.

In FIG. 1, the mobile body 2 includes a data communication module (DCM) 21 and a central electrical control unit (central ECU) 22. The mobile body 2 further includes a user interface (UIF) device 23, a preventive safety device 24, an advanced drive system (ADS) 25, and a sound/video/navigation (NAVI) device 26.

The DCM 21 is a communication device that accesses the network N and communicates with another mobile body, the vehicle center 3, the control center 4, or the like. The DCM 21 is capable of wireless communication via the mobile communication network.

The central ECU 22 manages each device in the mobile body 2. The central ECU 22 includes, for example, a processor and a memory. The processor executes a computer program on the memory (hereinafter simply referred to as a "program"), and executes processes as the central ECU 22. The central ECU 22 updates, for example, a program executed by the ECU mounted on each device in the mobile body 2 and manages the progress of the update of the program. Further, the central ECU 22 detects an error when the program is updated, and executes processes when the error occurs. The combination of the central ECU 22 and the DCM 21 is an example of the computer (in-vehicle computer) mounted on the vehicle.

The UIF device 23 provides a user interface, for example, when updating the program executed by the ECU mounted on each device in the mobile body 2. The user interface is also called a reprogramming human machine interface (reprogramming HMI). The UIF device 23 also includes an ECU similar to the central ECU 22. The central ECU 22, the ECU in the UIF device 23, and the like can be referred to as a common ECU group.

The preventive safety device 24 has a built-in ECU and executes collision avoidance support processing by processing a program. The preventive safety device 24 executes, for example, support for avoiding a collision, notification of lane departure, automatic high beam, radar cruise control, and the like based on signals from a radar and a sensor such as a camera.

A spatial information service (SIS) 27, an advanced drive extension (ADX) 28, and the like are connected to the ADS 25. The ADS25, the SIS27, and the ADX28 each have a built-in ECU and execute higher-level and more advanced driving support processing by processing a program. For example, the ADS 25 detects a vehicle, a three-dimensional object, or the like around the mobile body 2 by a detection signal from light detection and ranging (LiDAR), estimates a position of the mobile body 2 itself, and executes motion control.

The SIS 27 provides the ADS 25 with a posture of the mobile body 2 itself, a position on the map, and the like. That is, the SIS27 acquires position information from a global navigation satellite system (GNSS) or a global positioning system (GPS). Further, the SIS 27 acquires a signal of hexaxial acceleration from a gyro sensor, route information, map information, or the like from a navigation system. The SIS27 calculates the posture of the mobile body 2 itself, the position on the map, and the like based on the acquired information. The ADX28 applies an artificial intelligence (AI) system, recognizes and processes information from the above various sensors and the like, and notifies the ADS25 of the processing result.

A rear seat entertainment (RSE) 2B is connected to the sound/video/NAVI device 26. The sound/video/NAVI device 26 and the RSE2B each have a built-in ECU, and by processing a program, provides the user of the mobile body 2 with various functions using sound, video, map information, and the like.

As shown in FIG. 1, for example, accelerated mobile pages (AMP) 29 for signal amplification and an operation unit 2A can be further connected to the sound/video/NAVI device 26. The operation unit 2A is, for example, a touch display, displays information to the user, and receives an operation from the user. When the mobile body 2 is a vehicle having a rear seat, the RSE2B independently provides a television broadcast, video of a digital versatile disc (DVD), or the like to the user sitting in the rear seat in a vehicle cabin.

The ECUs in the respective preventive safety device 24, ADS25, and sound/video/NAVI device 26 and ECUs of devices connected to these devices can be referred to as an individual ECU group. The central ECU 22 manages the progress of the update of the program mounted on the individual ECU group and the error at the time of updating the program. The program used (executed by the ECU) for each ECU of the preventive safety device 24, the ADS25, the SIS27, and the sound/video/NAVI device 26 is one example of a program related to movement control of the mobile body (travel control of the vehicle).

The vehicle center 3 is operated by organizations such as companies that sell or maintain the mobile body 2 or a company, etc. that is entrusted by the companies, etc. The vehicle center 3 manages parts such as ECUs mounted on all mobile bodies sold or maintained by these companies, etc. Further, the vehicle center 3 manages a type and a version of the program executed by each of these ECUs. The vehicle center 3 distributes update data for updating the program to the mobile body 2 and the like. The update data can be simply called an update program. Each ECU included in the common ECU group and the individual ECU group is an example of the "in-vehicle computer".

The control center 4 manages an operation, maintenance, and the like of each mobile body 2. The control center 4 is, for example, a computer of a fleet management service (FMS) company that provides an FMS. The control center 4 creates, for example, an operation schedule such as an operation start time, an operation, an operation end time, and a maintenance time zone of the mobile body 2 that is regularly operated. The control center 4 updates the operation schedule in a timely manner, distributes the updated operation schedule to the mobile body 2, and manages the operation of the mobile body 2. Further, the control center 4 manages a service used irregularly, for example, a usage schedule for sharing, the usage schedule including travel start date and time, travel end date and time, and maintenance date and time of the mobile body 2 in a ride sharing service. Further, the control center 4 manages a rental schedule of the mobile body 2 used for rental purposes. Hereinafter, the schedules related to the operation, the usage, the rental purposes, etc. of the mobile body 2 are collectively referred to simply as an operation schedule. Further, when the mobile body 2 is an electrified vehicle, the control center 4 incorporates a charging schedule of the mobile body 2 into the operation schedule and manages the schedule.

As described above, the mobile body 2 is equipped with various parts incorporating the ECUs. The program executed by the ECU in each part receives update due to improvement or defect countermeasures. By the way, the mobile body 2 is required to be safe. Therefore, the update of the program for the ECU mounted on the mobile body 2 is executed during a maintenance period when travel of the mobile body 2 is stopped (time during which the mobile body 2 is stopped).

The vehicle center 3 notifies the control center 4 of the latest update contents and update schedule of the program for each ECU in the form of release note. When the control center 4 receives the release note, the control center 4 incorporates the update schedule of the program for each ECU into the operation schedule of each mobile body 2. That is, the control center 4 plans the operation schedule of the mobile body 2 such that the update of the program for each ECU is completed during the maintenance period when the mobile body 2 is not traveling. The control center 4 notifies the mobile body 2 of the confirmed operation schedule (distribution of the plan in FIG. 1), and executes updating the program for each ECU.

The DCM 21 of the mobile body 2 communicates with the vehicle center 3 and the control center 4 via the network N. The DCM 21 receives the operation schedule including a program update plan from the control center 4 (distribution of the plan in FIG. 1). The central ECU 22 is connected to the DCM 21 via, for example, a network in the mobile body shown as an example of Ethernet (registered trademark).

The DCM 21 accesses the vehicle center 3 according to the received operation schedule, acquires update data for updating the program, and transfers the update data to the central ECU 22. The central ECU 22 updates the program for each ECU including the common ECU group and the individual ECU group during the maintenance period when the mobile body 2 is stopped. When the update of each ECU by the central ECU 22 is completed, the DCM 21 notifies the control center 4 of a completion report.

The UIF device 23 is connected to the central ECU 22 via, for example, a network in the mobile body shown as an example of a controller area network (CAN (registered trademark)). The UIF device 23 may accept input for confirmation by an operation of the user via the reprogramming HMI. That is, the central ECU 22 may request the user to confirm start updating the program with the UIF device 23, and may start updating the program after the confirmation is obtained. The UIF device 23 itself also acquires the update data from the central ECU 22 and updates the program of the UIF device 23.

The preventive safety device 24 is connected to the central ECU 22 via, for example, the network in the mobile body 2 shown as an example of a controller area network with flexible datarate (CAN-FD (CAN is a registered trademark)). The preventive safety device 24 receives the update data of the program from the central ECU 22 and executes updating the program. Then, the preventive safety device 24 reports a status associated with the update to the central ECU 22.

The ADS 25 and the sound/video/NAVI device 26 are connected to the central ECU 22 via, for example, the network in the mobile body shown as an example of the Ethernet (registered trademark). The ADS 25 and the sound/video/NAVI device 26 each receive the update data of the program from the central ECU 22. Then, the ADS 25 and the sound/video/NAVI device 26 each execute updating their own programs and programs for their subordinate ECUs. The ADS 25 and the sound/video/NAVI device 26 report the status associated with the update to the central ECU 22.

Configuration Example of Vehicle Center and Control Center

FIG. 2 is a diagram showing a configuration example of a terminal device 200 that can operate as the vehicle center 3 or the control center 4. As the terminal device 200, for example, a general-purpose information processing device (computer) such as a personal computer (PC) or a workstation, or a dedicated information processing device such as a server machine can be applied. The terminal device 200 has a communication function and can be connected to the network N by wire or wirelessly.

In FIG. 2, the terminal device 200 includes a processor 201 as a processing unit or a control unit (controller), a storage device 202, a communication device 203, an input device 204, and a output device 205, which are connected to each other via a bus 206. Each of the vehicle center 3 and the control center 4 may be a single terminal device 200 or a set (cloud) of two or more terminal devices 200.

The storage device 202 includes a main storage device and an auxiliary storage device. The main storage device is used as a storage area for programs and data, a deployment area for programs, a work area for programs, and a buffer area for communication data. The main storage device is composed of a random access memory (RAM) or a combination of a RAM and a read only memory (ROM). The auxiliary storage device is used as a storage area for data and programs. A non-volatile storage medium can be applied as the auxiliary storage device. The non-volatile storage medium includes, for example, a hard disk, a solid state drive (SSD), a flash memory, an electrically erasable programmable read-only memory (EEPROM), and the like.

The communication device 203 is a circuit that performs communication processing, and operates as a transmission unit and a reception unit (communication unit). For example, the communication device 203 is a network interface card (NIC). Further, the communication device 203 may be a wireless communication circuit that performs wireless communication (LTE, 5G, wireless local area network (LAN) (Wi-Fi), Bluetooth Low Energy (BLE), and the like). Further, the communication device 203 may include both a circuit that performs wired communication processing and a wireless communication circuit.

The input device 204 includes keys, buttons, a pointing device, a touch panel, and the like, and is used for inputting information. The input device 204 may include a microphone (voice input device). The output device 205 is, for example, a liquid crystal display, an organic electroluminescence (EL) display, or the like, and displays information and data. The output device 205 may include a speaker (voice output device).

The processor 201 is, for example, a central processing unit (CPU). The processor 201 performs various processes by executing various programs stored in the storage device 202.

For example, the processor 201 of the terminal device 200 that operates as the vehicle center 3 causes the terminal device 200 to operate as the vehicle center 3 described above by executing the program. Further, the processor 201 of the terminal device 200 that operates as the control center 4 executes the program that causes the terminal device 200 to operate as the control center 4 by executing the program.

As the processor 201 described above, a plurality of the CPUs may be applied, or a multi-core CPU may be applied. At least a part of the processes performed by the CPU may be performed by a processor other than the CPU such as a digital signal processor (DSP) or a graphical processing unit (GPU). Further, at least a part of the processes performed by the CPU may be performed by a dedicated or a general-purpose integrated circuit (hardware). The integrated circuit includes an application-specific integrated circuit (ASIC) or a field-programmable gate array (FPGA). Alternatively, at least a part of the processes performed by the CPU may be executed by a combination of the processor and the integrated circuit. The combination is called, for example, a microcontroller (MCU), a system-on-a-chip (SoC), a system large-scale integration (LSI), a chipset, or the like.

Data Example

FIG. 3 is an example of the release note transmitted from the vehicle center 3 to the control center 4. In the example shown in FIG. 3, the release note is in the form of "keyword: value", and the value for the keyword is specified. Further, in the example of FIG. 3, a set of "keyword: value" is closed with curly braces "{ }" and described hierarchically.

That is, from FIG. 3, it can be understood that a vehicle type of the mobile body 2 is E-palette GO. Also, it can be understood that a system version to be released is V07-01. Also, it can be understood that the release note is a release note of a program of which the release date is ddmmmyyyy. Here, the system version is a version given to the entire program group installed in the mobile body 2. Further, in this release note, a program type, a version, data size (data amount, volume) of the update data of the program (update data), etc. are described for each ECU type (ECU type). For example, it can be understood that the version of PC1 that is a program of the central ECU is V07-01-1 and the data size is V1 MB.

The release note is not limited to the form shown in FIG. 3. For example, the release note may be described in a specified format such as hyper text markup language (HTML) or extensible markup language (XML). Further, the release note may be described in a tabular format in which records including a plurality of elements are arranged. Further, the release note can also include information indicating the importance of updating the program. The importance is indicated by, for example, "normal" and "high", and the central ECU 22 may be configured to perform an operation different from the "normal" update for the "high" update, that is, the update that is highly important.

FIG. 4 is data example of an operation plan (operation schedule that is distributed in "distribution of the plan" in FIG. 1) that is distributed by the control center 4 to the mobile body 2 to be managed. The operation plan is created for each mobile body 2. Therefore, the operation plan includes a mobile boy identification (ID) for identifying the mobile body 2. Further, in the data example of FIG. 4, the operation plan is created for each day and includes the date, month, and year. Further, in the data example of FIG. 4, the operation schedule, the maintenance schedule, and the like of the mobile body 2 for each time zone are specified in the operation plan.

For example, in the date, month, and year (DDMM-MYYYY), maintenance of the mobile body 2 is performed from 12:00 a.m. to 9:00 a.m. The maintenance includes charging the battery of the mobile body ID: E-PALET-TEEV1 and updating the program. The mobile body ID: E-PALETTEEV1 operates from 9:00 a.m. to 11:00 a.m. The mobile body ID: E-PALETTEEV1 stops operating from 11:00 a.m. to 1:00 p.m., is in a maintenance state, and a battery is charged. The mobile body ID: E-PALETTEEV1 operates from 1:00 p.m. to 11:00 p.m., stops operating after 11:00 p.m., and is in a maintenance state. In the example of FIG. 4, the details of the maintenance schedule and the operation schedule between 1:00 p.m. and 10:00 p.m. are omitted.

As shown in FIG. 4, the program is updated and the update data of the program is downloaded during the time zone when the mobile body 2 is in the maintenance state, that is, during stop of the vehicle. In the example shown in FIG. 4, the download of the update data of the program and the update of the program are planned during the maintenance state time zone from 12:00 a.m. to 7:59 a.m. However, acquisition of the update data by downloading is not essential, and the update data may be read from a storage medium connected to the central ECU 22. In this case, it is not necessary to specify the download plan. Further, the download time and the program update time may be specified (set) in different time zones with the operating state (traveling) time zone interposed therebetween. For example, the download may be set in the time zone from 12:00 a.m. to 7:59 a.m., and the program update may be set in the time zone from 11:00 a.m. to 12:59 p.m.

The data structure of the operation plan created by the control center 4 is not limited to the data example shown in FIG. 4. For example, in FIG. 4, the time zone is defined for each hour. However, the time zone may be defined for each minute. Further, the operation plan may not be created every day, and may be created, for example, every week. Further, the operation plan may be created every month. Further, the operation plan may be created every specified day (Monday to Friday) from weekdays, every Saturday, and every holiday.

FIG. 5 is a diagram illustrating state information of each mobile body 2 held by the control center 4. The state information records the current update state of the program of the mobile body 2, the battery state, and the like. The state information is stored in a predetermined database (stored in the storage device 202) of the control center 4. In the example shown in FIG. 5, the state information includes the mobile body ID, the last update date, the system version of the entire program group installed in the mobile body 2, the previous operation completion date and time, and the battery state.

Here, the mobile body ID is identification information for uniquely identifying the mobile body 2 as in FIG. 4. The last update date is the update date when the program group of the ECU of each part in the mobile body 2 (in FIG. 5, the mobile body ID is E-PALETTEE V1) is finally updated. The system version of the program group is the version of the entire updated program group in the mobile body 2 as in FIG. 3.

However, the state information is not limited to such a configuration. For example, the state information may hold the current version of each program (version of each program in FIG. 3, Version: V07-01-1, etc.) individually for each ECU of each part. When the control center 4 receives the update completion report from the mobile body 2, the control center 4 records the last update date and time and the system version of the entire updated program group in the state information.

The previous operation completion date and time is the date and time when the mobile body 2 (in FIG. 5, the mobile body ID is E-PALETTEEV1) completes the previous operation and reports this to the control center 4. The battery state is the current state of charge (SOC) of the battery. The control center 4 acquires the state of charge of the battery from the mobile body 2 together with the operation completion report, and records this in the "battery state" of the state information. The SOC of the battery is indicated, for example, as a percentage display of the ratio of the remaining amount to the amount of electric power when the battery is fully charged.

Processing at Control Center

Figure 6:
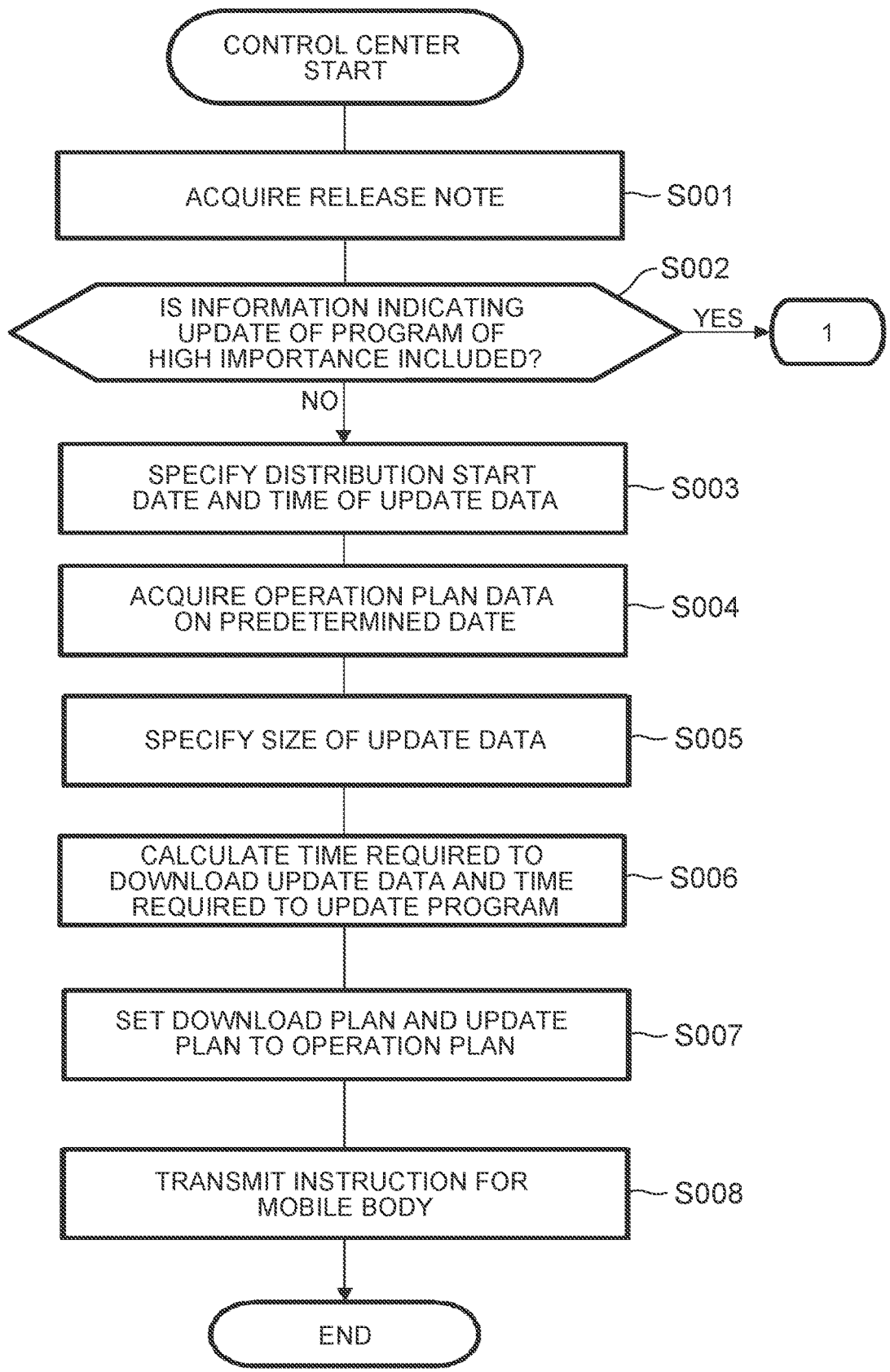
FIG. 6 is a flowchart showing a processing example of the control center.
Figure 7:
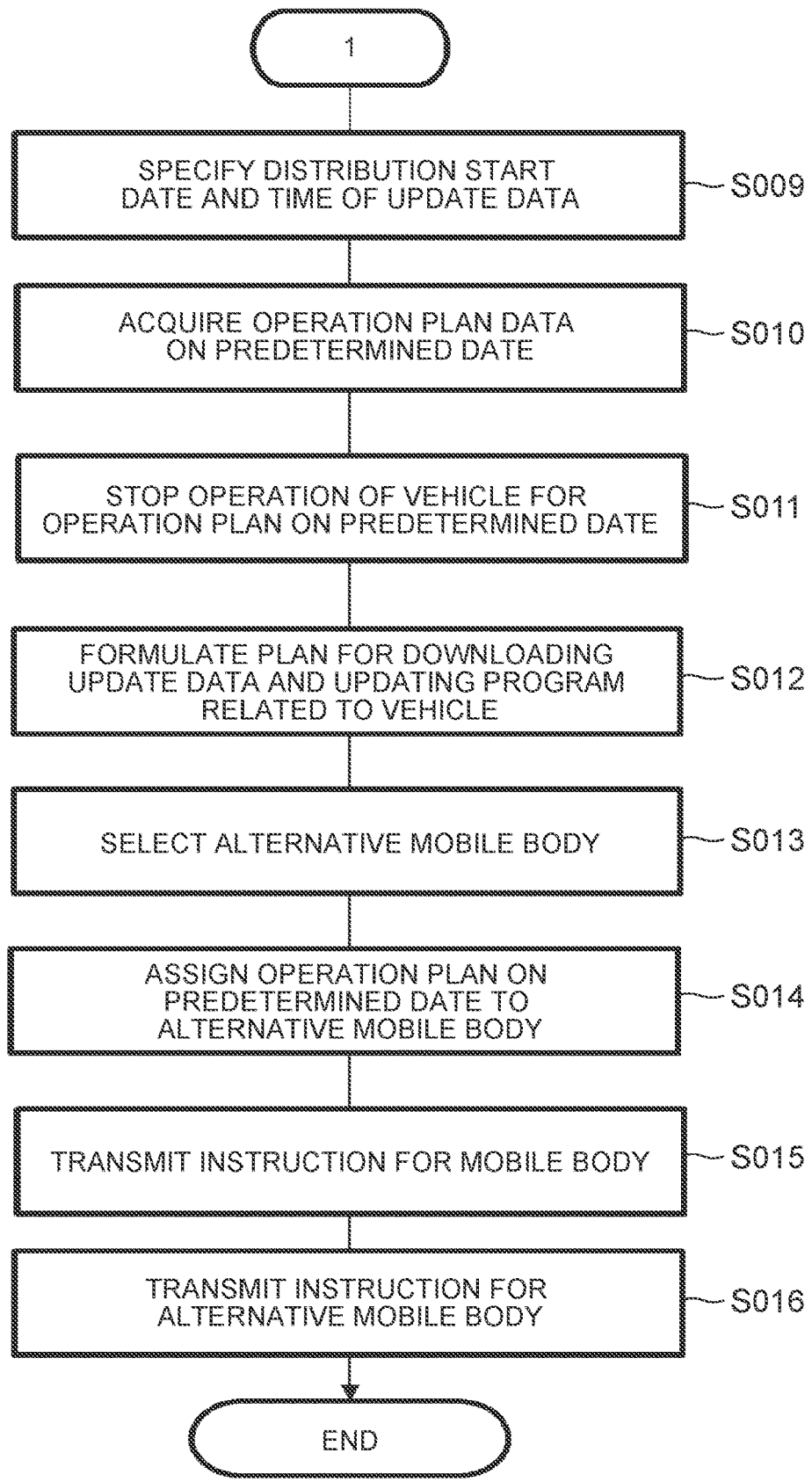
FIG. 7 is a flowchart showing a processing example of the control center.

FIGS. 6 and 7 are flowcharts showing a processing example of the processor 201 (processor 201 of the control center 4) of the terminal device 200 that operates as the control center 4. The processing shown in FIGS. 6 and 7 may be performed for each mobile body 2 to be managed, or for each group to which two or more mobile bodies 2 grouped by an appropriate method belong.

In FIG. 6, in step S001, the processor 201 acquires the release note received by the control center 4 from the vehicle center 3 via the network N, and specifies the program to be updated from the system version in the release note.

In step S002, the processor 201 determines whether the release note includes information indicating the update of the program of high importance. When it is determined that the information indicating the update of the program of high importance is included, the process proceeds to step S009, and when it is determined that the information indicating the update of the program of high importance is not included, the process proceeds to step S003.

In step S003, the processor 201 specifies the distribution start date and time of the update data of the program from the release date in the release note. In step S004, the processor 201 acquires, from the storage device 202, the operation plan data of the mobile body 2 on a predetermined date after the distribution start date and time (for example, the distribution start date or the next day of the distribution start date).

In step S005, the processor 201 specifies the size of the update data, that is, the size of the data to be downloaded from the release note.

In step S006, the processor 201 calculates the time required to download the update data from the size of the update data, information indicating the communication performance (throughput) of the DCM 21, and the like. Further, the processor 201 calculates the time required to update the program using the update data from the size of the update data, information indicating the performance of the central ECU 22 (the amount of data that can be processed in a unit time), and the like.

For example, when the size (download size) of the update data is 1 gigabyte (GB) and the throughput of the DCM 21 is 40 mega bit per second (Mbps), the communication time is 1 GB/40 Mbps=200 seconds. This communication time is the time required to download the update data. Further, when the central ECU 22 can process 1 megabyte (MB) of data per second, the time (update time) required to update (rewrite) the program is 1 GB/(1 MB/s)=1000 seconds. The communication time is an example of a "second time length", and the update time is an example of a "first time length".

In step S007, the processor 201 sets a download plan for the update data and an update plan for the program to the operation plan. That is, the processor 201 specifies the maintenance state time zone on the date from the operation plan data of the predetermined date acquired in step S003, and specifies the maintenance state time zone having a time length equal to or longer than a total value of the communication time and the update time described above. Then, the processor 201 sets a predetermined time in the specified time zone (for example, the same time as the start time of the time zone or a time after the predetermined time has elapsed from the start time) as the download start time. Also, the time after the download end time is set as the update start time. At this time, the update start time is set such that the update end time falls within the specified time zone. Here, when the time required to download the update data and update the program does not fall within a certain maintenance state time zone, the processor 201 downloads the update data in the certain maintenance state time zone and updates the program in another maintenance state time zone. As described above, the processor 201 sets (formulates) the plan for downloading the update data and updating the program in the operation plan of the mobile body 2.

In step S008, the processor 201 generates an instruction for the mobile body 2. The instruction for the mobile body 2 includes an instruction to start downloading the update data at the download start time and an instruction to start updating the program using the update data at the update start time. The instruction for the mobile body 2 is transmitted from the communication device 203 to the network N and received by the DCM 21 of the mobile body 2.

In step S009 and step S010, as in step S003 and step S004, the processor 201 specifies the distribution start date and time of the update data from the release note, and acquires the operation plan data on the predetermined date after the distribution start date and time.

In step S011, the processor 201 determines to stop the operation of the mobile body 2 with respect to the operation plan on the predetermined date (stop of the operation plan). As the predetermined date, the date including the distribution start date and time of the update data may be preferentially selected.

In step S012, the processor 201 formulates a plan for downloading the update data of the mobile body 2 and updating the program on the predetermined date. For example, it is assumed that the distribution start date and time of the update data is 9:30 a.m., and in the operation plan on the predetermined date including the distribution start date and time as in the example shown in FIG. 4, for example, the mobile body 2 plans to be caused to travel between 9:00 a.m. and 10:59 a.m. In this case, the processor 201 stops the operation plan on the predetermined date, and provides a time zone in which the mobile body 2 continuously maintains the stopped state after 9:30 a.m. on the predetermined date. Then, the processor 201 formulates a plan for downloading the update data and updating the program (setting a download start time and an update start time) in the time zone.

In step S013, the processor 201 selects an alternative mobile body (alternative vehicle). The alternative mobile body is a mobile body (vehicle) that operates according to the operation plan in place of the mobile body 2 of which the operation has been stopped. In the storage device 202, information on the alternative mobile body of which the program has been updated and that is not scheduled to operate on the predetermined date is stored in advance, and the processor 201 defines the mobile body specified by the information as the alternative mobile body.

In step S014, the processor 201 assigns the operation plan on the predetermined date to the alternative mobile body. For example, when the mobile body 2 of which the operation has been stopped is scheduled to operate after 9:00 a.m. with the contents shown in FIG. 4, the processor 201 assigns the operation plan after 9:00 a.m. to the alternative mobile body. At this time, the processor 201 may assign the entire operation plan on the predetermined data to the alternative mobile body.

In step S015, the processor 201 generates an instruction for the mobile body 2. The instruction for the mobile body 2 includes an instruction to change the operation plan indicating the stop of operation on the predetermined date, an instruction to start downloading the update data at the download start time on the predetermined date, and an instruction to start updating the program using the update data at the update start time. The instruction for the mobile body 2 is transmitted from the communication device 203 to the network N and received by the DCM 21 of the mobile body 2.

In step S016, the processor 201 generates an instruction for the alternative mobile body. The instruction for the alternative mobile body includes an instruction to change the operation plan indicating the contents of the operation on the predetermined date. The instruction for the alternative mobile body is transmitted from the communication device 203 to the network N and received by the alternative mobile body. The alternative mobile body changes the operation plan on the predetermined date and operates in place of the mobile body 2 on the predetermined date.

Processing at Mobile Body and Vehicle Center

Figure 8:
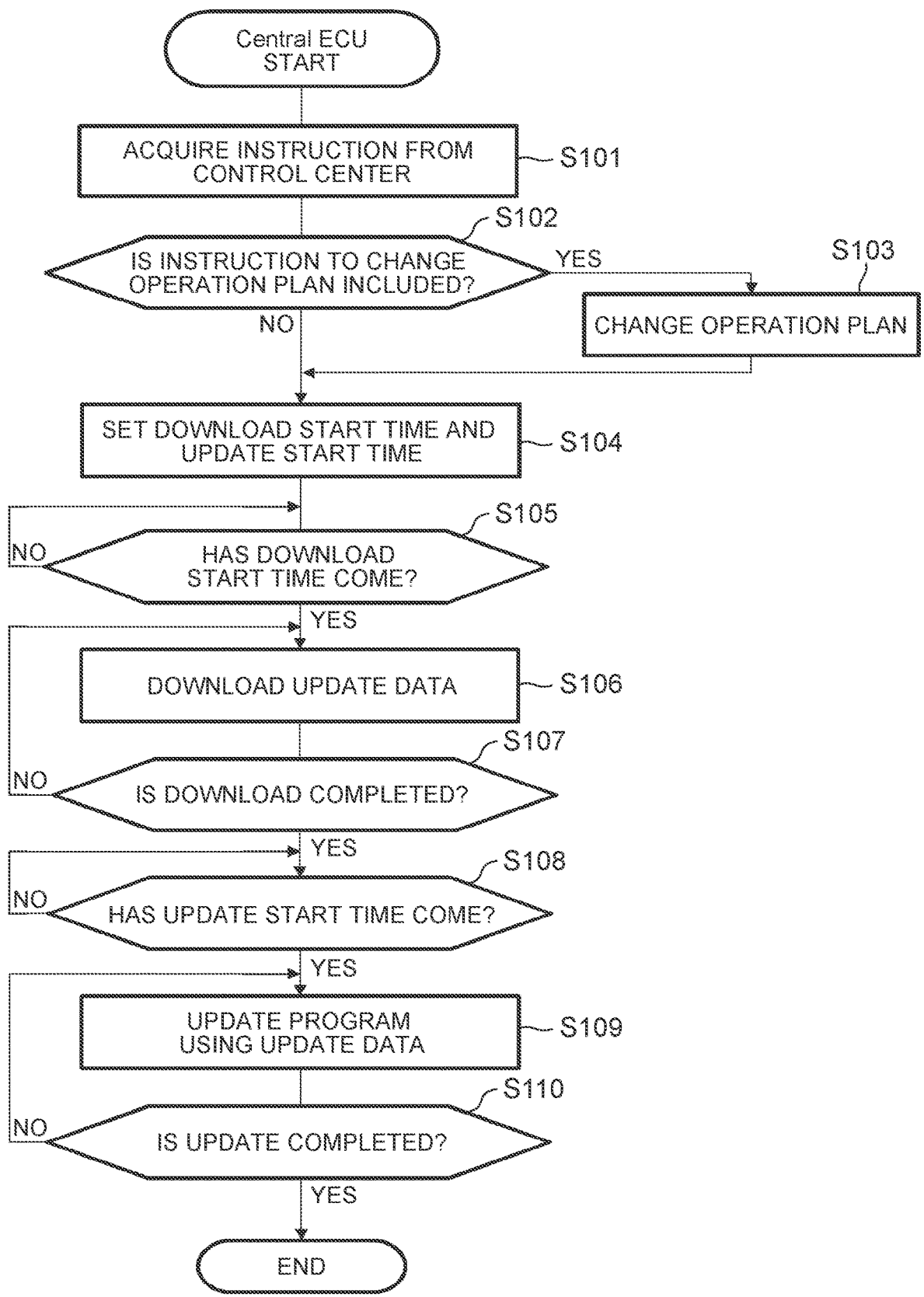
FIG. 8 is a flowchart showing a processing example of a central electrical control unit (ECU) of a vehicle.

FIG. 8 is a flowchart showing a processing example of the central ECU 22 (hereinafter referred to as the "ECU 22") of the mobile body 2. FIG. 9 is a flowchart showing a processing example of the vehicle center 3.

In step S101, the ECU 22 acquires an instruction related to the download and update received by the DCM 21 from the control center 4 via the network N.

In step S102, the ECU 22 determines whether the instruction from the control center 4 includes an instruction to change the operation plan. At this time, when it is determined that the instruction to change the operation plan is included, the process proceeds to step S103, and when it is determined that the instruction to change the operation plan is not included, the process proceeds to step S104.

In step S103, the ECU 22 changes the operation plan. That is, the ECU 22 changes, according to the change instruction, the operation plan on the predetermined date specified by the instruction to change the operation plan. As a result, the original operation plan on the predetermined date is stopped.

In step S104, the ECU 22 makes a reservation setting to start downloading the update data at the download start time on the predetermined date, which has been included in the instruction from the control center 4. Further, the ECU 22 makes a reservation setting to start updating the program using the update data at the update start time on the predetermined date.

In step S105, the ECU 22 waits until the download start time has come, and when it is determined that the download start time has come, the ECU 22 downloads the update data (step S106). That is, the ECU 22 generates a message regarding download request of the update data, and the download request is transmitted from the DCM 21 to the network N and received at the vehicle center 3.

In the vehicle center 3, the processor 201 of the terminal device 200 (processor 201 of the vehicle center 3) that operates as the vehicle center 3 acquires the download request via the communication device 203 (step S201 in FIG. 9).

The processor 201 of the vehicle center 3 controls to read the update data corresponding to the download request from the storage device 202 of the vehicle center 3 based on information indicating the update data of the program included in the download request. Further, the processor 201 of the vehicle center 3 controls to transmit the update data to the mobile body 2 (step S202 in FIG. 9). As a result, the update data is transmitted from the communication device 203 to the network N.

In the mobile body 2, the DCM 21 receives the update data from the network N. The ECU 22 of the mobile body 2 receives the update data from the DCM 21. As described above, the update data is downloaded.

When the ECU 22 determines in step S107 that the download is completed (YES in step S107), the ECU 22 waits until the program update start time has come (step S108). When it is determined that the update start time has come (YES in step S108), the ECU 22 updates the program using the update data (step S109). Then, when it is determined that the program update is completed (YES in step S110), the ECU 22 ends the processes of FIGS. 6 and 7.

Action Effect of Embodiment

In the embodiment, the control center 4 (information processing device) includes the processor 201 (control unit). The processor 201 acquires the release note as information on the update of the program (used by the ECU mounted on the mobile body 2) implemented in the mobile body 2 (vehicle) operated according to the operation plan. Based on the release note, the processor 201 formulates the plan for updating the program while the mobile body 2 is stopped in the operation plan (step S007 in FIG. 6).

By updating the program in accordance with the plan in which the mobile body 2 updates the program according to the above configuration, the program is updated while the mobile body 2 is stopped (the vehicle is stopped). Since the program includes a program related to the movement of the mobile body 2 (travel of the vehicle), there is a possibility that the movement may be hindered by the update while the mobile body 2 moves. By updating the program while the vehicle is stopped, the program can be updated in a safe environment. That is, the program can be updated at an appropriate timing.

In the embodiment, the processor 201 calculates (acquires) the first time length (update time) required to update the program based on the information that indicates the size of the update data of the program and that is included in the information on the update (release note) (step S006 in FIG. 6). Then, the processor 201 formulates the plan for updating the program during a time when the mobile body 2 is stopped (maintenance time, for example, 12:00 a.m. to 7:59 a.m.) in the operation plan, the time lasing for the first time length or longer (step S007). This allows the program to be updated while the mobile body 2 is stopped.

Further, in the embodiment, the processor 201 further executes acquiring the second time length (communication time) required to download the update data based on information indicating the size of the update data (step S006). Then, the processor 201 formulates the plan for updating the program during a time when the mobile body 2 is stopped (maintenance state time zone) in the operation plan, the time lasting for a time length equal to or longer than the total value of the first time length and the second time length (step S007). As a result, the update data can be downloaded in a safe environment where the mobile body 2 is stopped.

Further, in the embodiment, in step S007 of FIG. 6, the processor 201 can formulate the plan for downloading the update data during the first stop time of the mobile body 2 (for example, the time zone from 12:00 a.m. to 7:59 a.m. in FIG. 4) in the operation plan. Further, the processor 201 can formulate the plan for updating the program using the downloaded update data during the second stop time (for example, the time zone from 11:00 a.m. to 12:59 p.m. in FIG. 4) that is different from the first stop time. As described above, it is possible to download the update data and update the program at different time zones.

Further, in the embodiment, the processor 201 formulates the plan for updating the program during the maintenance state (while the vehicle is stopped) of the mobile body 2 after the distribution start date and time of the update data of the program included in the release note (steps S006 and S007).

Further, in the embodiment, the processor 201 can stop the operation of the mobile body 2 in the operation plan when the release note includes information indicating the update of the program of high importance (step S011 in FIG. 7). Then, the processor 201 can formulate the plan for updating the program for the mobile body 2 that has been stopped due to the stop of operation (step S012).

Further, the processor 201 can stop the operation of the mobile body 2 after the distribution start date and time of the update data of the program (step S011). Then, the processor 201 can formulate the update plan for downloading the update data for the mobile body 2 that has stopped due to the stop of the operation, and updating the program using the update data (step S012).

Further, in the embodiment, the processor 201 can formulate the plan for operating the alternative vehicle (alternative mobile body) of which the program has been updated in place of the vehicle (mobile body 2) (steps S013 and S014).

Further, in the embodiment, the processor 201 downloads the update data of the program while the mobile body is stopped (the vehicle is stopped) according to the plan for updating the program. Then, the processor 201 can transmit, to the mobile body 2, the instruction to update the program using the update data (step S008, step S016).

In the embodiment, a case where the control center 4 is an information processing device has been described. However, the DCM 21 of the mobile body 2 may operate as an information processing device that receives the release note and performs the processes of steps S001 to S007, S009 to S014, and S016 shown in FIGS. 6 and 7.

Others

The above-described embodiment is merely an example, and the present disclosure may be appropriately modified and implemented without departing from the scope thereof. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Such a non-transitory computer-readable storage medium is, for example, a disc of any type such as a magnetic disc (floppy (registered trademark) disc, hard disk drive (HDD), and the like) and an optical disc (compact disc read-only memory (CD-ROM), digital versatile disc (DVD), Blu-ray disc, and the like). Further, the non-transitory computer-readable medium includes a ROM, a RAM, an erasable programmable read-only memory (EPROM), an EEPROM, a magnetic card, a flash memory, an optical card, and a medium of any type that is appropriate for storing electrical commands.

What is claimed is:

1. An information processing device comprising a control unit that executes:
creating an operation plan including an operation start time, an operation, an operation end time, and a maintenance time of a vehicle that is autonomously driven,
acquiring information on update of a program implemented in the vehicle, the information on the update of the program including an importance of updating the program; and
formulating a plan for updating the program during the maintenance time of the vehicle in the operation plan based on the information on the update of the program,
wherein the control unit
stops the operation of the vehicle in the operation plan when the information on the update of the program indicates that the update of the program is of high importance,
formulates an update plan of the program for the vehicle that has been stopped due to the stop of the operation, and
transmits the operation plan and the update plan to a vehicle electronic control unit (ECU) of the vehicle to control the vehicle to operate according to the operation plan and to update the program in the vehicle according to the update plan,
acquires a first time length required to update the program based on the information that indicates a size of update data of the program and that is included in the information on the update of the program,
acquires a second time length required to download the update data based on the information indicating the size of the update data, and
formulates the plan for updating the program during a period when the vehicle is stopped in the operation plan, the period lasting for a time length equal to or longer than a total value of the first time length and the second time length.

2. The information processing device according to claim 1, wherein the program is related to travel control of the vehicle.

3. The information processing device according to claim 1, wherein the control unit formulates a download plan for downloading update data of the program during a first stop time of the vehicle in the operation plan, and formulates the plan for updating the program using the update data of the program during a second stop time that is different from the first stop time of the vehicle.

4. The information processing device according to claim 1, wherein the control unit formulates the plan for updating the program during the maintenance time when the vehicle is stopped after distribution start date and time of update data of the program included in the information on the update of the program.

5. The information processing device according to claim 1, wherein the control unit:
stops the operation of the vehicle after distribution start date and time of update data of the program; and
formulates the update plan for downloading the update data of the program for the vehicle that has been stopped due to the stop of the operation, and updating the program using the update data.

6. The information processing device according to claim 1, wherein the control unit formulates an alternative operation plan for operating an alternative vehicle of which the program has been updated in place of the vehicle.

7. The information processing device according to claim 1, wherein the control unit downloads update data of the program while the vehicle is stopped, and transmits an instruction to update the program using the update data, according to the plan for updating the program.

8. An information processing method wherein an information processing device executes:
creating an operation plan including an operation start time, an operation, an operation end time, and a maintenance time of a vehicle that is autonomously driven;
acquiring information on update of a program implemented in the vehicle, the information on the update of the program including an importance of updating the program;
formulating a plan for updating the program during the maintenance time of the vehicle in the operation plan based on the information on the update of the program;
stopping the operation of the vehicle in the operation plan when the information on the update of the program indicates that the update of the program is of high importance; and formulating an update plan of the program for the vehicle that has been stopped due to the stop of the operation; and transmitting the operation plan and the update plan to a vehicle electronic control unit (ECU) of the vehicle to control the vehicle to operate according to the operation plan and to update the program in the vehicle according to the update plan, wherein the information processing device further executes:

acquiring a first time length required to update the program based on the information that indicates a size of update data of the program and that is included in the information on the update of the program;

acquiring a second time length required to download the update data based on the information indicating the size of the update data; and formulating the plan for updating the program during a period when the vehicle is stopped in the operation plan, the period lasting for a time length equal to or longer than a total value of the first time length and the second time length.

9. The information processing method according to claim 8, wherein the program is related to travel control of the vehicle.

10. The information processing method according to claim 8, wherein the information processing device:

formulates a download plan for downloading update data of the program during a first stop time of the vehicle in the operation plan; and formulates the plan for updating the program using update data of the program during a second stop time that is different from the first stop time of the vehicle.

11. The information processing method according to claim 8, wherein the information processing device formulates the plan for updating the program during the maintenance time of the vehicle after distribution start date and time of update data of the program included in the information on the update of the program.

12. The information processing method according to claim 8, wherein the information processing device:

stops the operation of the vehicle after distribution start date and time of the update data of the program; and formulates the update plan for downloading the update data of the program for the vehicle that has been stopped due to the stop of the operation and updating the program using the update data.

13. The information processing method according to claim 11, wherein the information processing device formulates an alternative operation plan for operating an alternative vehicle of which the program has been updated in place of the vehicle.

14. An information processing system comprising:

an information processing device; and a vehicle that is able to communicate with the information processing device, wherein:

the information processing device includes a control unit that executes creating an operation plan including an operation start time, an operation, an operation end time, and a maintenance time of the vehicle that is autonomously driven, acquiring information on update of a program implemented in the vehicle, the information on the update of the program including an importance of updating the program, formulating a plan for updating the program during the maintenance time of the vehicle in the operation plan based on the information on the update of the program, stopping the operation of the vehicle in the operation plan when the information on the update of the program indicates that the update of the program is of high importance, formulating an update plan of the program for the vehicle that has been stopped due to the stop of the operation, and transmitting, to the vehicle, an instruction to update the program according to the plan for updating the program;

the vehicle includes a central control unit that executes:

controlling the operation of the vehicle according to the operation plan and updating the program in the vehicle according to the instruction; and the control unit further executes:

acquiring a first time length required to update the program based on the information that indicates a size of update data of the program and that is included in the information on the update of the program;

acquiring a second time length required to download the update data based on the information indicating the size of the update data; and formulating the plan for updating the program during a period when the vehicle is stopped in the operation plan, the period lasting for a time length equal to or longer than a total value of the first time length and the second time length.

* * * * *